No. 889,180. PATENTED MAY 26, 1908.
R. F. DANIELS.
SAW SHARPENING MACHINE.
APPLICATION FILED DEC. 13, 1906.

8 SHEETS—SHEET 1.

Witnesses:
Chas. E. Gaylord.
John Enders.

Inventor:
Richard F. Daniels,
By L. B. Coupland,
Atty.

No. 889,180.　　　　　　　　　　　　PATENTED MAY 26, 1908.
R. F. DANIELS.
SAW SHARPENING MACHINE.
APPLICATION FILED DEC. 13, 1906.

8 SHEETS—SHEET 4.

Fig. 4.

Witnesses:
Geo. E. Gaylord
John Enders

Inventor:
Richard F. Daniels,
By L. B. Coupland,
Atty.

No. 889,180.
PATENTED MAY 26, 1908.
R. F. DANIELS.
SAW SHARPENING MACHINE.
APPLICATION FILED DEC. 13, 1906.
8 SHEETS—SHEET 5.
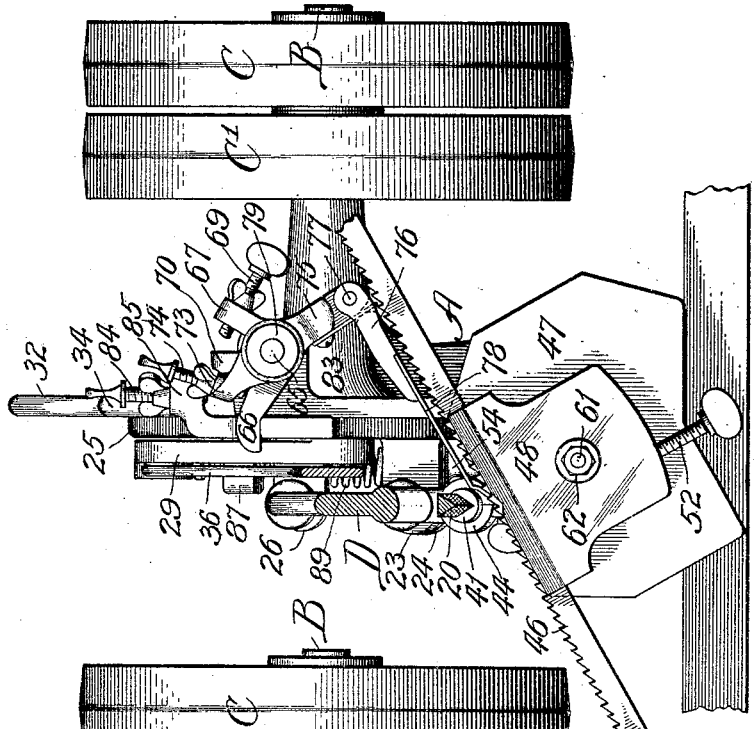
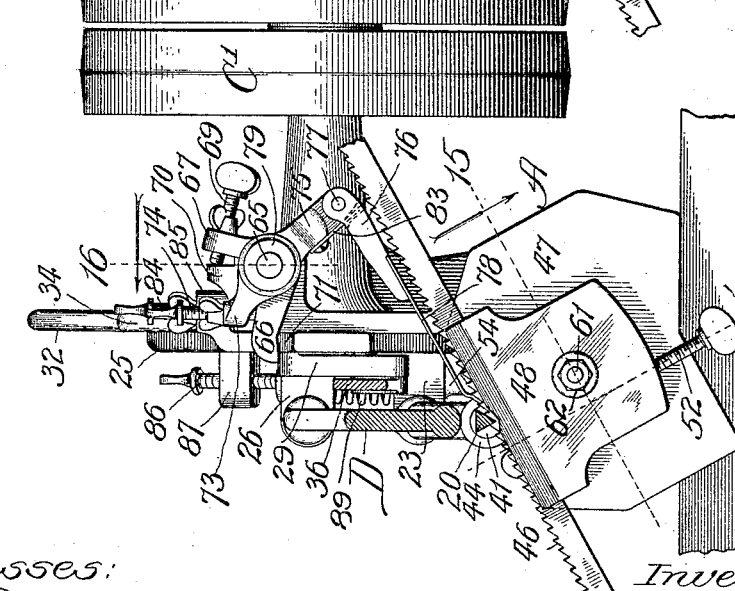
Witnesses:
Inventor:
Richard F. Daniels,
By L. B. Coupland,
Atty.

No. 889,180.
PATENTED MAY 26, 1908.
R. F. DANIELS.
SAW SHARPENING MACHINE.
APPLICATION FILED DEC. 13, 1906.
8 SHEETS—SHEET 6.
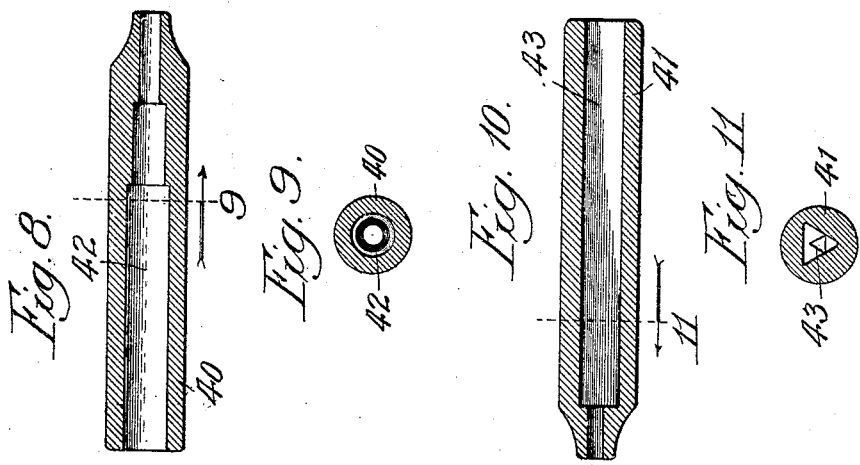
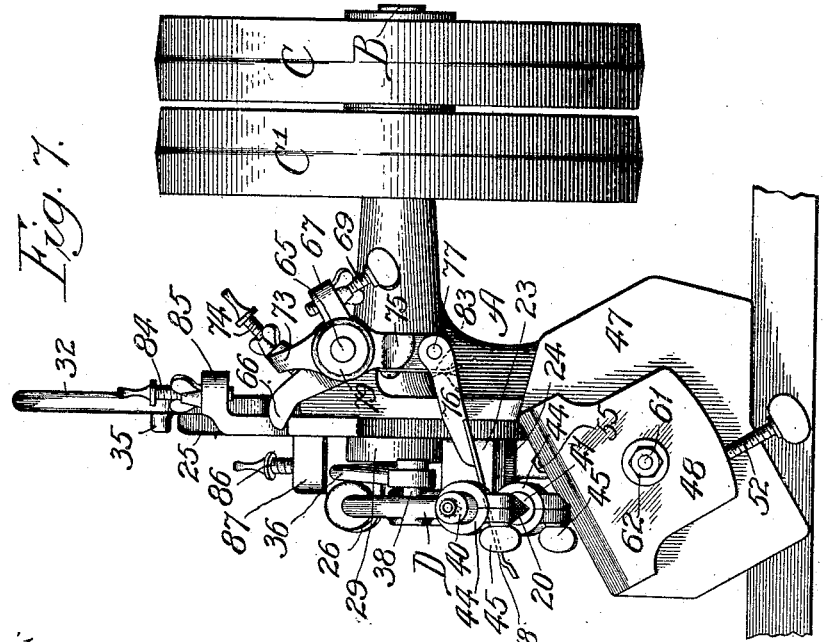
Witnesses:
Inventor:
Richard F. Daniels,
By L. B. Coupland,
Atty.

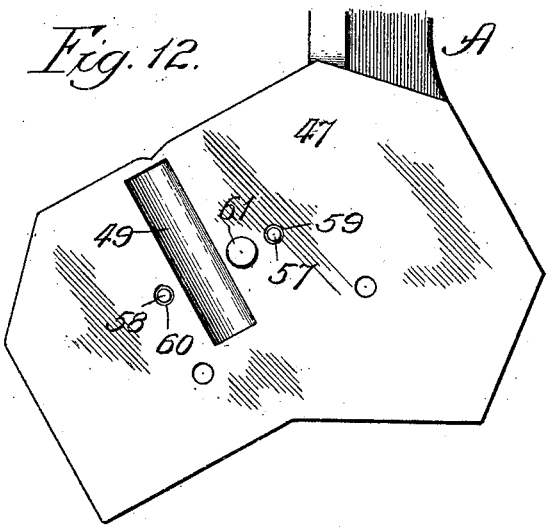
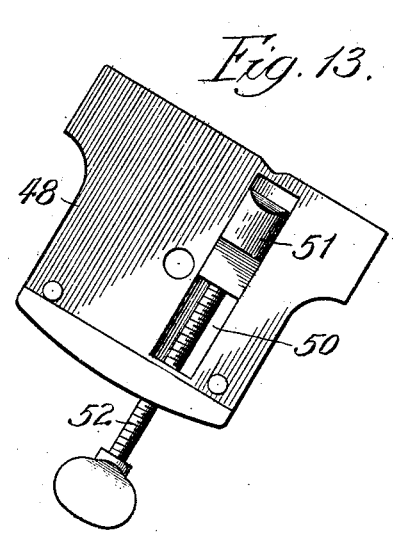
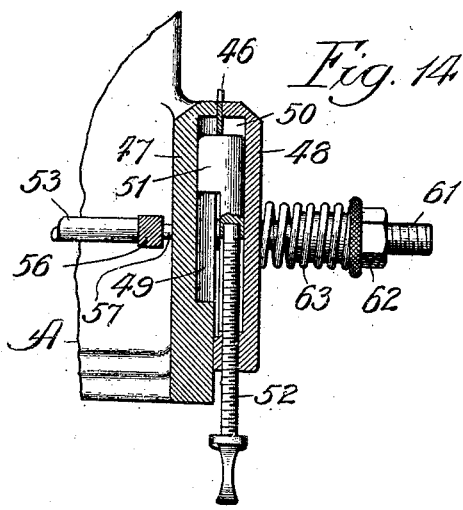
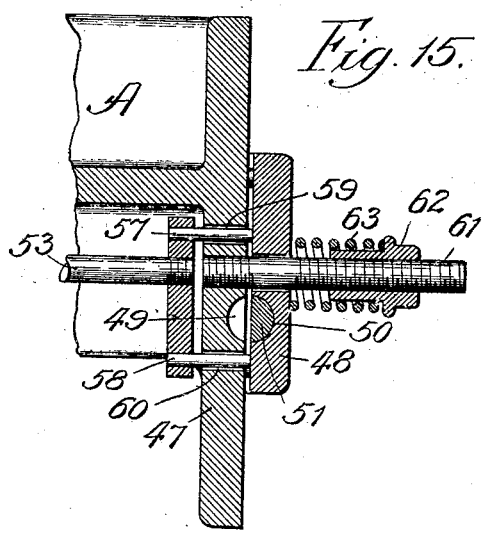

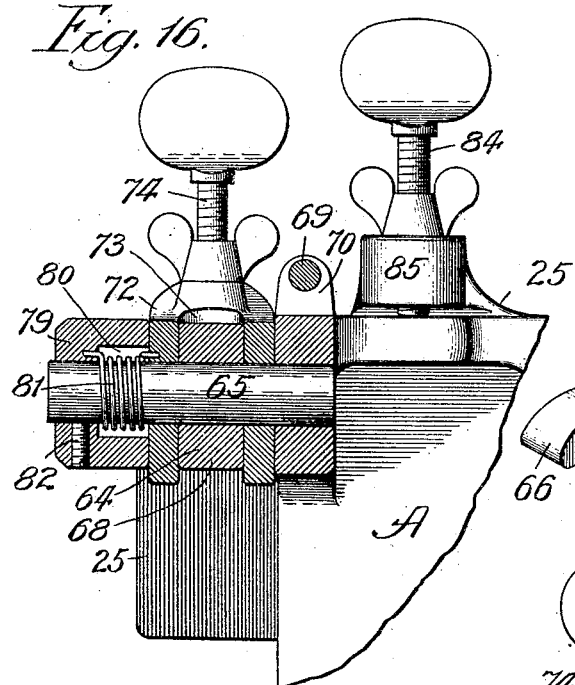
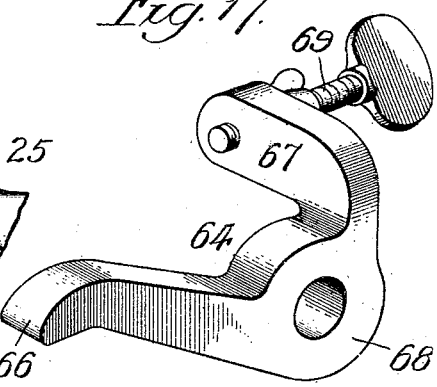
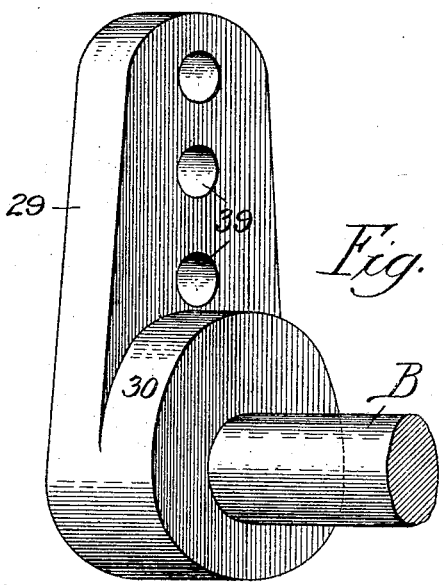
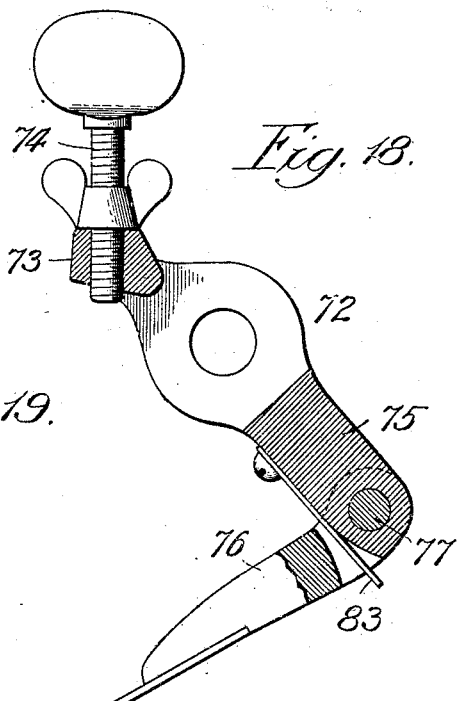

UNITED STATES PATENT OFFICE.

RICHARD F. DANIELS, OF CHICAGO, ILLINOIS, ASSIGNOR OF TEN ONE-HUNDREDTHS TO GEORGE RETTIG, JR., OF CHICAGO, ILLINOIS.

SAW-SHARPENING MACHINE.

No. 889,180.   Specification of Letters Patent.   Patented May 26, 1908.

Application filed December 13, 1906. Serial No. 347,677.

*To all whom it may concern:*

Be it known that I, RICHARD F. DANIELS, citizen of the United States, residing at Chicago, in the county of Cook and State of Illinois, have invented certain new and useful Improvements in a Saw-Sharpening Machine, of which the following is a specification.

This invention relates to saw sharpening machines of the automatic type and has for its object to provide a device of this character that is more especially adapted for use on band saws and particularly small band saws that now usually have to be dressed by hand for want of a practical machine.

This machine is entirely automatic in practical working and when once adjusted will dress all the teeth alike without further attention from the operator.

The machine is simple in construction, positive in operation and may be easily adjusted as to the different parts in conforming to the type of saws to be operated upon.

Figure 1:
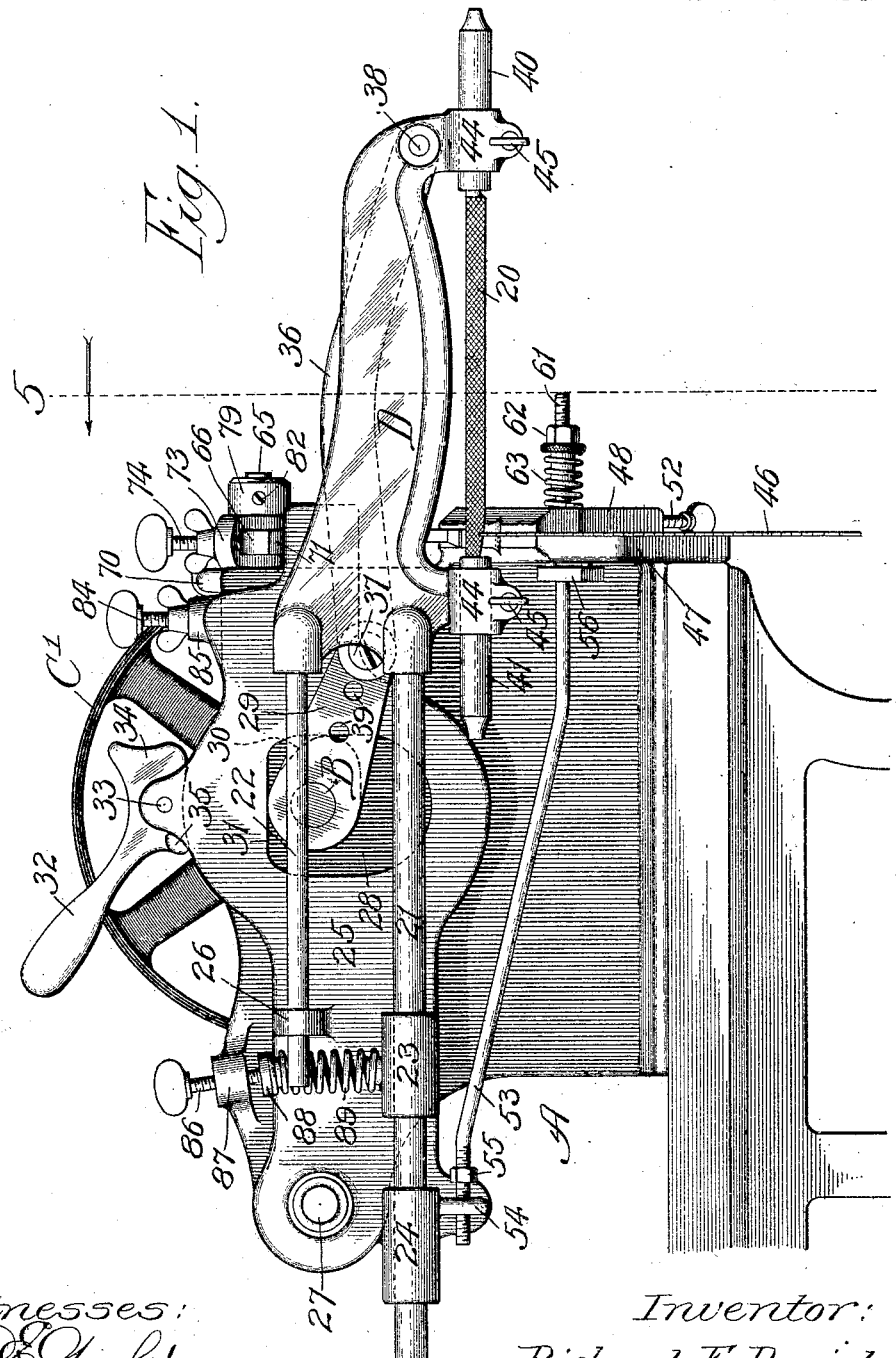
Figure 2:
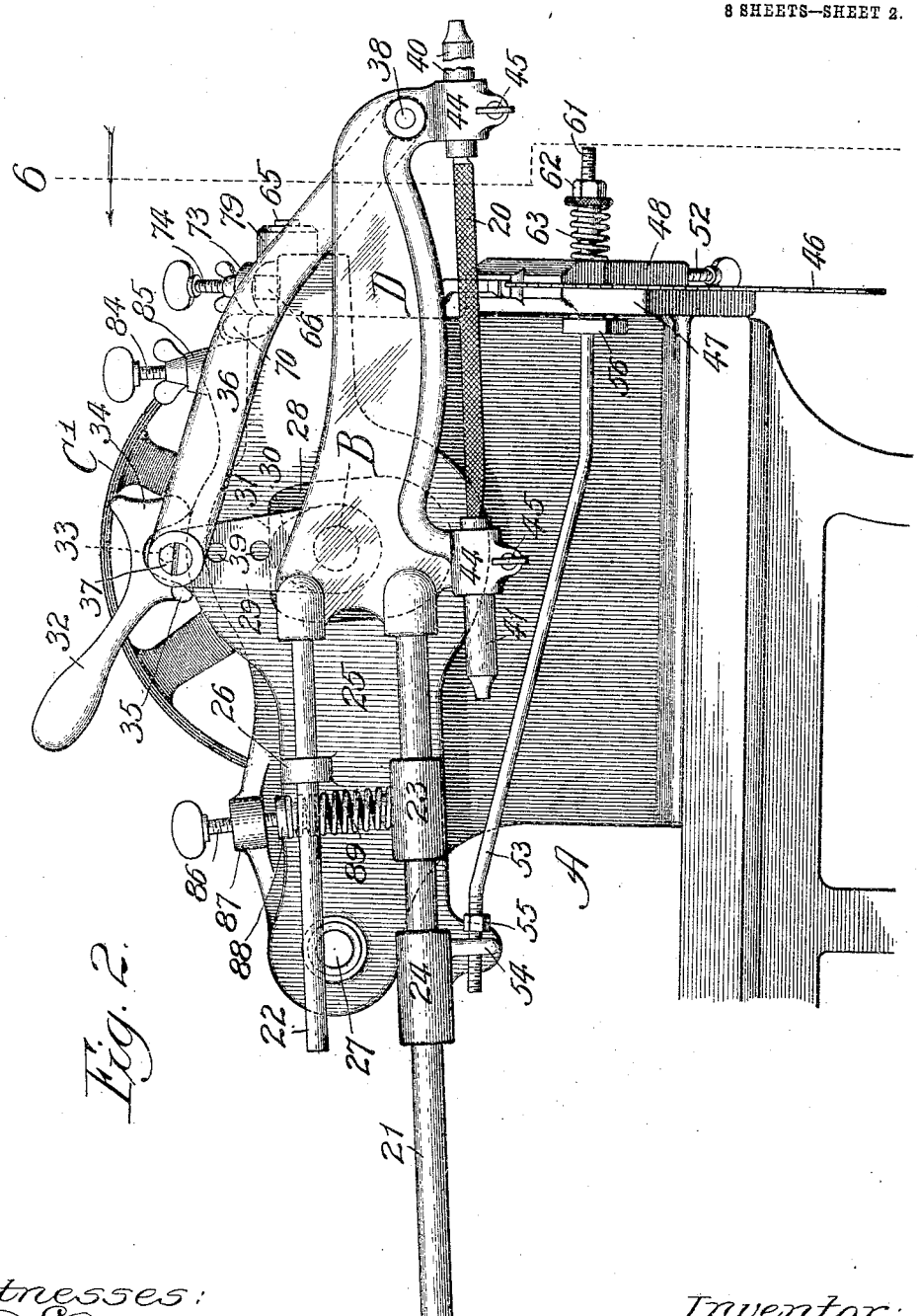
Figure 3:
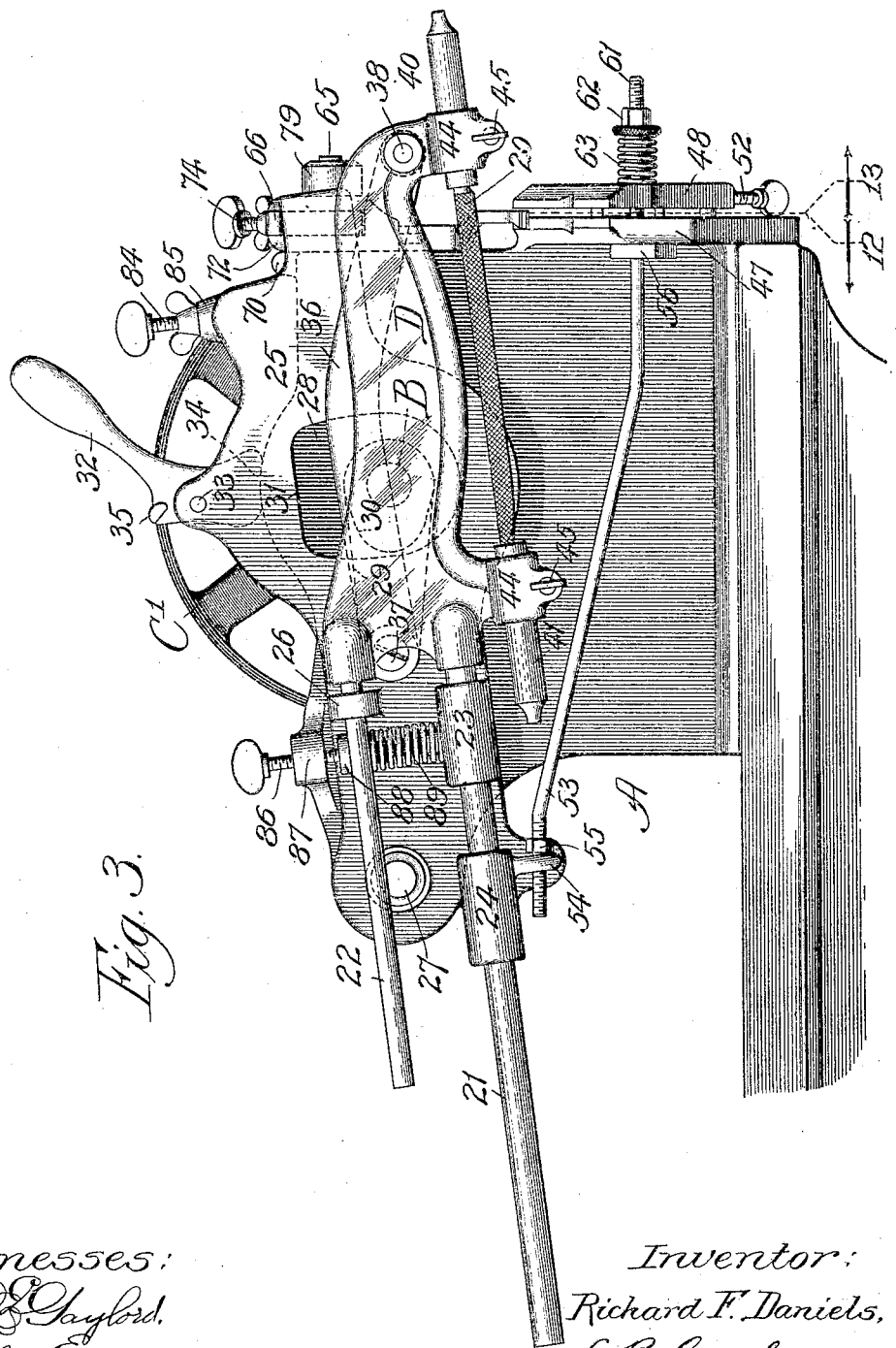

In the accompanying drawings, Figure 1 is a front elevation showing the reciprocating carriage-part in its outermost position. Fig. 2 is a similar view showing the carriage in an intermediate position with reference to its reciprocating limit. Fig. 3 is a view showing the carriage in its innermost position. Fig. 4 is a plan. Fig. 5 is an end elevation and part section on line 5, Fig. 1, showing the sharpening file and feed-finger in engagement with the saw. Fig. 6 is a similar view, on line 6 Fig. 2, showing the file in its raised or disengaged position. Fig. 7 is an end elevation showing the feed-finger in its raised disengaged position, the saw being omitted. Fig. 8 is a longitudinal section of one of the file holding socket handles. Fig. 9 is a transverse section of the same on line 9, Fig. 8. Fig. 10 is a longitudinal section of the companion file holding handle. Fig. 11 is a transverse section on line 11, Fig. 10. Figs. 12 and 13 are inside face views of the two saw clamping jaws, on lines 12 and 13 of Fig. 3. Figs. 14 and 15 are sectional views of the same on lines 14 and 15 respectively, of Fig. 5. Fig. 16 is a section on line 16, Fig. 5; and Figs. 17, 18 and 19 are detached details.

A may represent the different parts of the supporting frame; B the driving shaft properly journaled therein; C C¹ the usual tight and loose pulleys mounted thereon which may belt with the source of motive power.

A saw-filing carriage D has a reciprocating movement across the front of the machine in a horizontal plane, and also a slight up and down movement in conforming to the conditions required in practical working. This carriage carries the sharpening tool or file 20, and is supported in its working position by means of companion guide rods 21 and 22 properly secured thereto and clearly shown in Figs. 1, 2 and 3. The lower rod 21 has its movement through two bearing guide-lugs 23 and 24 forming a rigid part of a vibrating-plate 25 located back of the carriage D and lying approximately in a plane therewith. The upper rod 22 runs through a bearing guide-lug 26, also a rigid part of plate 25. The rear end of the vibrating plate 25 has a pivotal connection with the frame as at 27, the opposite end being free and having an up and down movement. This plate is provided near its longitudinal center with an enlarged opening 28 through which the inner end of driving shaft B extends. This end of the driving shaft has a crank-arm 29 and a cam 30 rigidly mounted thereon. This cam is in line with the surrounding wall of the opening 28 but only comes in contact with the upper horizontal wall line 31 when the machine is in operation and the hand lever 32 is in the position shown in Figs. 1 and 2. When the hand-lever 32 is shifted to the opposite position (Fig. 3) the working parts are raised up out of the way, the vibrating plate 25 ceases its up and down movement and becomes stationary, the cam 30 rolling around without having contact therewith, the reciprocating carriage continues its movement. This position permits of the saw being conveniently inserted or removed without having to arrest the motion of the driving-shaft.

The hand-lever 32 has a pivotal connection 33 with the vibrating-plate 25 and has a cam-foot 34 formed on the lower end thereof as best shown in Figs. 1 and 2 and indicated by dotted lines in Fig. 3. In its normal position (Figs. 1 and 2) this lever rests loosely, the heel 35 preventing the same from dropping back too far. When the lever is normal the vibrating plate is in its lowest position. When the lever is shifted over to the opposite position, shown in Fig. 3, the toe end of the cam has a lifting bearing on the adjacent top edge of the frame-part and raises the vibrating-plate and file and carriage up from their working position for the purpose before mentioned. With the lever 32 in this abnormal position the cam 30 rolls around without contacting the surrounding wall of the vibrating-plate, as indicated by dotted lines.

The required reciprocating motion is transmitted to the carriage D through the medium of a connecting rod 36, one end of which is attached to the crank-arm 29 by a crank-pin 37, and the outer end having a pivotal connection 38 with the corresponding end of the carriage. It will be noted (Fig. 19) that this crank-arm is provided with a number of crank-pin holes 39, so that the inner end of the connecting-rod may be adjusted to different positions in shortening or lengthening the stroke in accordance with the length of the sharpening tool used, or the limit within which the reciprocating movement of the carriage is to be confined.

The respective ends of the sharpening file 20 are held in holders 40 and 41, longitudinal and transverse sections of which are shown in Figs. 8, 9, 10 and 11. As shown in Figs. 8 and 9 the seat passage 42 may be cylindrical in cross section and of a varying diameter to provide for files of different diameters. The handle 41, (Figs. 10 and 11) also shows passage of different areas as to the respective ends and of a triangular shape so as to provide for the reception of the ends of different sizes and retain the same in place against turning. The seating passages may also be different in the respective ends so that the holders may be reversed in holding files having peculiar shaped tang and point ends. The triangular or three cornered form of file is used in the machine illustrated, but it is obvious that other forms may be used in accordance with the requirements of the work. The file-holders are in turn inserted in split-binders or sleeves 44 and removably locked therein by clamping screws 45. These split binders form an integral part of the carriage D. The file holders may be turned in these binders so as to set the file or sharpening tool at any desired angle with reference to the saw in accordance with the shape of tooth wanted.

In the operation of sharpening, the saw 46 is normally held in place between a pair of clamping jaws 47 and 48, best shown in Figs. 5, 6 and 7 and in detail in Figs. 12 and 13. The stationary jaw 47 is an integral part of the machine and is provided with a recess groove 49, best shown in Fig. 12, which shows the inside clamping face of the jaw. The outside movable jaw 48 (Fig. 13) is provided with a corresponding recess or groove 50 on its inside joining face which coincides with the recess in the fixed jaw 47 when the jaws are mounted together in their working position. A vertically movable slide 51 is seated in the joint recess-grooves in the clamping jaws and forms a guide and support for the saw, the back of which rests thereon as the same is moved along in the operation of dressing. An adjusting-screw 52 is threaded up through the lower edge of the movable jaw 48 and engages the slide-rest 51. By a proper manipulation of the screw 52 the slide 51 may be raised or lowered in accordance with the width of the saw in bringing the teeth into proper position above the clamping-jaws with reference to the contact of the sharpening tool. The slide 51, it will be noted, is inclined at an angle of approximately 30°, so that its upper saw-guiding end supports the saw at such angle that the file may descend squarely between the teeth, whereby both sides of the file have equal pressure against adjacent teeth.

A rod 53 extends across the face of the machine under and out of the way of the reciprocating carriage, as best shown in Figs. 1, 2 and 3. The back end of this rod extends loosely through a lug 54 formed on the corresponding end of the vibrating-plate 25. A nut 55 is threaded on this end of the rod. The opposite end of this rod stops short of the inner side of the fixed clamping jaw.

A cross-bar 56 is rigidly mounted on this end of the rod 53 and has pins 57 and 58 fixed therein which are adapted to project through apertures 59 and 60 in the fixed clamping jaw and have a pushing contact with the inner face of the movable jaw (Fig. 15) and force the same to its open position at the proper time. The cross-bar 56 comes to a stop against the inner face of the fixed jaw and limits the opening thrust movement of the pins 57 and 58.

A stud 61 is loosely inserted through the movable saw clamping jaw and is threaded in the fixed jaw, as best shown in Fig. 15. The outer threaded end of this stud has a sleeve-nut 62 mounted thereon, and between which and the outer side is a spring 63. By means of this sleeve-nut the tension of the spring 63 can be properly adjusted to automatically close the movable jaw when the opening pressure of rod 53 is relaxed and hold the saw just tight enough to prevent chattering and at the same time permit of the same being readily moved along tooth by tooth in the operation of sharpening.

When the nut 55 on the inner end of rod 53 is properly adjusted with reference to the lug 54, the operation of throwing the hand-lever 32 over to the position shown in Fig. 3, has the effect of raising the free end of the vibrating-plate to its highest position and causing the lug 54 to exert just sufficient pressure on the nut 55 to impart a very slight endwise movement on rod 53 and through the medium of the push-pins 57 and 58 automatically forces the movable jaw open just far enough for the insertion or removal of the saw, as shown in Fig. 3. In this position the bar 56 comes to a stop against the outer side of the fixed jaw. When the hand-lever is returned to its normal position the pressure of spring 63 will close the movable clamping-jaw.

The feed-finger mechanism will be next described.

An angle rocking-lever 64 (Figs. 4, 5, 6, 7, 16 and 17) is loosely mounted on a stationary pivot-shaft 65. The part 66 (Fig. 17) of lever 64 extends forward and overhangs the top edge of vibrating-plate 25 and in position to be contacted thereby on its up movement. The part 67 of lever 64 is bent inward at nearly right angles with reference to the hub-part 68 and has a hand adjusting screw 69 inserted through the outer end thereof. The point of this hand-screw will come to a stop against a lug 70 on the frame and limits the down movement of the part 66 of the rocking-lever 64, so that it does not follow the vibrating-plate to its lowermost position, there being a space 71 between the part 66 and the vibrating-plate, as best shown in Fig. 5. In this view (Fig. 5) the file is in engagement with the saw and just starting inward in the operation of sharpening a tooth as shown in Fig. 1. A rocking-lever 72 has its upper part bifurcated to straddle the hub-part 68 of rocking-lever 64, when loosely mounted on pivot-shaft 65, as shown in Figs. 4 and 16. The upper bifurcated end of lever 72 is closed by an arched bridge 73 down through which is inserted hand adjusting screw 74, coming to a bearing on the part 66 of lever 64. From the bifurcated portion of lever 72 a single part 75 extends backward and downward (Figs. 4 and 18) and has an arm 76 pivoted thereto as at 77. The upper end of a feed-finger 78 being secured to the arm 76 and the opposite free end being positioned to drop into and engage the teeth of the saw in the operation of moving the same along in regular order to be acted upon by the sharpening tool.

The pivot shaft 65 has a cap 79 adjustably mounted on the outer end thereof (Fig. 16) and is provided with a chamber 80 in which is located a spring 81 coiled around said shaft. One end of this spring is inserted in lever 72 and the other outer end in the cap 78. The cap 78 may be turned around on its pivot shaft and locked at any point by a set-screw 82. By this means a torsion twist may be imparted to the spring 80 which will then have the effect of returning the companion rocking-levers to their normal position.

The hand-screw 69 in rocking lever 64 is for the purpose of adjusting the travel of the feed-finger in engaging the teeth of the saw at the proper time. By turning outward on this screw the throw of the finger is lengthened and in the opposite direction the throw is shortened, by reason of the screw coming to a stop against the lug 70 sooner or later. The hand-screw 74 in the bridge part of lever 72 provides another adjustment for the feed-finger so that the same may be adjusted with finer precision in bringing the teeth of fine or coarse saws into the exact position for the proper contact of a file or other sharpening tool used. This saw feeding mechanism may be termed a compound arrangement and enables the operator to adjust the different parts to a nicety and secure the best possible results.

In operation, supposing the carriage to be in its outermost position shown in Fig. 1. In this position the high part of the cam on the driving shaft has rolled on out of contact with the upper line wall of the opening in the vibrating-plate which is now in its lower position and the file in engagement with the saw for the back sharpening movement. This back or inward movement continues until the cam has rolled around far enough to again come in contact with the upper line wall of the opening in the vibrating-plate and starts the latter on its up movement and simultaneously the filing carriage therewith to the position shown in Figs. 2 and 6. On this up movement the outer free end of the vibrating-plate comes in contact with the overhanging end of rocking-lever 64, as shown in Fig. 6, and moves the same upward and turns the shaft 65 and imparts a forward movement to the feed-finger in moving the saw to bring the next tooth into position for the engagement of the sharpening tool. The spring 80 will then act to return the compound feed mechanism to its normal position and retract the feed-finger to engage another tooth when the vibrating-plate has dropped down out of contact with the rocking-lever 64.

It will be understood that in the continuous operation the feed-finger is always in contact with the saw, and only when the hand-lever 32 is thrown over to its abnormal position is the feed-finger elevated to the disengaged position shown in Fig. 7. The upper end of a spring 83 is secured to the rocking-lever 72, the lower free end extending down into engagement with the feed-finger-arm 76 and imparts sufficient pressure thereto to prevent the feed-finger from accidentally dropping down.

A hand-screw 84 is threaded in a lug 85 forming an integral part of the vibrating-plate and is adapted to have a stop contact on the top edge of the frame in limiting the down movement of the plate and thereby gaging the depth that the file will enter the saw in the operation of sharpening and jointing.

A hand-screw 86 is threaded down through a lug 87, forming a part of the machine frame, and engages a spring-cap 88 mounted on the upper end of a spring 89, the lower end of which has a bearing on the guide-lug 23 formed on the vibrating-plate 25. The purpose of this hand-screw and spring is to regulate the pressure of the file or sharpening tool on the saw.

It will be noted that in the operation, the sharpening tool engages the saw and does its work on the back movement so that the pressure of the saw is against the rigid clamping jaw and prevents any liability to spring out of a true line and therefore dresses every tooth alike.

It will be noted that the operative connection with the reciprocating carriage is lower than the connection with the driving crank, so as to impart different speeds to the carriage, a slower travel on the filing side, and a quicker return movement.

Having thus described my invention, what I claim is—

1. In a saw sharpening machine, the combination of file-holding mechanism, means for reciprocating the same transversely and longitudinally with reference to a file held thereby, normally closed saw-holding members coöperatively related to said file-holding mechanism, and a manual device having operative connection with the file-holding mechanism and with the saw-holding members whereby movement of the manual device shifts the file-holding mechanism to carry the file away from the saw and opens the saw-holding members, said device being constructed to hold said file-holding mechanism in such shifted position and said saw-holding members open.

2. In a saw sharpening machine, the combination of saw-holding members which are normally closed, a vibratory plate for moving the sharpening tool toward and from the saw, a reciprocatory tool-holding carriage mounted on said plate for moving the tool across the teeth of the saw, manual means for shifting said plate to carry the tool away from the saw and holding the plate in such shifted position, and means for opening the saw-holding members which is positioned so as to escape actuation by the plate during the normal movement thereof but to be engaged and actuated thereby when shifted by said manual means as specified.

3. In a saw sharpening machine, the combination of file-holding mechanism, means for reciprocating the same transversely and longitudinally with reference to a file held thereby, normally closed saw-holding members coöperatively related to said file-holding mechanism, means for opening the saw-holding members which is positioned so as to escape actuation by the file-holding mechanism during the normal operation thereof but to be engaged and actuated thereby when given a greater than normal movement away from the saw, and manual means for effecting such movement of the file-holding mechanism.

4. In a saw sharpening machine, the combination of a rigid and a loose saw-holding member, means for holding said members yieldingly closed, an oscillatory plate for moving the sharpening tool toward and from the saw, a reciprocatory tool-holding carriage mounted on said plate for moving the tool across the teeth of the saw, and means actuated by the plate for releasing the loose saw-holding member, comprising a rod passing loosely through the plate and having an adjustable stop for engagement therewith, said rod having an extension which passes through the rigid saw-holding member into engagement with the inner face of the loose member.

5. In a saw sharpening machine, the combination with saw holding means, of a vibratory plate for moving the sharpening tool toward and from the saw, a saw-feeding finger actuated by said plate on the retrograde stroke of the latter and adapted to be carried clear of the saw by a retrograde movement greater than the normal stroke, and manual means for throwing said plate in a retrograde direction for a distance greater than the normal stroke and maintaining the plate in such shifted position during the continued reciprocation of the carriage, whereby both tool and finger are held clear of the saw.

6. In a saw-sharpening machine, the combination with saw-holding and guiding means, and tool-holding and operating means, of a support carrying a shaft, a lever mounted on said shaft and adapted to have intermittent and adjustable engagement with a moving part, a second lever mounted on the same shaft and adapted to have adjustable engagement with the first lever, a feed-finger pivotally carried by the second lever, a hollow cap mounted on the shaft, a coil spring housed within the cap, one end secured to the cap and the other end to the second lever, and a set screw adjustably securing the cap to the shaft.

7. In a saw-sharpening machine, the combination with saw-holding and guiding means, and tool-holding and operating mechanism, of a saw-feed lever adapted to be actuated by a moving part, a feed-finger pivotally carried by said lever, and a spring interposed between the lever and finger and serving as a resilient stop to limit the movement of the latter relative to the former.

In testimony whereof I have signed my name to this specification in the presence of two subscribing witnesses.

RICHARD F. DANIELS.

Witnesses:
 L. B. COUPLAND,
 G. E. CHURCH.